US006957419B2

(12) United States Patent
Baker et al.

(10) Patent No.: US 6,957,419 B2
(45) Date of Patent: Oct. 18, 2005

(54) FACILITATING THE USE OF ALIASES DURING THE DEBUGGING OF APPLICATIONS

(75) Inventors: Barry M. Baker, Fishkill, NY (US); Daniel S. Gritter, Poughkeepsie, NY (US); Colette A. Manoni, Brewster, NY (US); Gerald B. Strait, Salt Point, NY (US); Mei-Hui Wang, Brookfield, CT (US); Joshua B. Wisniewski, Elizaville, NY (US)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 10/099,849

(22) Filed: Mar. 15, 2002

(65) Prior Publication Data

US 2003/0177421 A1 Sep. 18, 2003

(51) Int. Cl.[7] .............................................. G06F 9/44
(52) U.S. Cl. ...................... 717/124; 717/144
(58) Field of Search ............................ 717/124, 144; 707/100; 715/765

(56) References Cited

U.S. PATENT DOCUMENTS

| 4,636,940 A | 1/1987 | Goodwin, Jr. .............. 364/200 |
| 4,954,942 A | 9/1990 | Masuda et al. ............. 364/200 |
| 5,278,961 A | 1/1994 | Mueller ...................... 395/400 |
| 5,278,962 A | 1/1994 | Masuda et al. ............. 395/400 |
| 5,386,522 A | 1/1995 | Evans ........................ 395/400 |
| 5,555,412 A * | 9/1996 | Besaw et al. ............... 717/144 |
| 5,560,009 A | 9/1996 | Lenkov et al. .............. 395/700 |
| 5,689,684 A | 11/1997 | Mulchandani et al. ...... 395/500 |
| 5,715,460 A | 2/1998 | Acker et al. ................ 395/705 |
| 5,860,138 A | 1/1999 | Engebretsen et al. ....... 711/202 |
| 6,067,641 A | 5/2000 | McInerney et al. .......... 714/38 |
| 6,324,683 B1 * | 11/2001 | Fuh et al. ................... 717/124 |

FOREIGN PATENT DOCUMENTS

JP 5334096 12/1993 ............. G06F 9/45

\* cited by examiner

*Primary Examiner*—Tuan Dam
*Assistant Examiner*—Chih-Ching Chow
(74) *Attorney, Agent, or Firm*—Blanche E. Schiller, Esq.; Heslin Rothenberg Farley & Mesiti P.C.

(57) ABSTRACT

The use of aliases in the debugging of applications is facilitated. Aliases are used in debugging, even when the aliases are not known to the debug generation stage of the compiler. That is, aliases are used in debugging, even when debug information is not generated by the compiler for the aliases. In order to use the aliases in debugging, the aliases are resolved to their formal names, and then debug information corresponding to the formal names, and thus, the aliases, is obtained.

51 Claims, 4 Drawing Sheets

*200*

| ALIAS NAME | FORMAL NAME | USER |
|---|---|---|
| MYFLAG | CURRENTDSECT.FLAG | ALL USERS |
| myflag1 | currentstruct–>field1–>flag | USER A |
| myflag1 | differentstruct–>differentfield–>differentflag | USER B |
| DATA1 | REAL_LONG_NAME_DATA_FIELD | USER C |
| data1 | long_sruct–>long_union–>long_struct–>long_fieldname | ALL USERS |
| DATA1 | REAL_LONG_NAME_DATAFIELD | USER D |
| data2 | LONG_LABEL_USING_DSECT.LONG_NAME | 9.117.20.1 |

FACILITATING THE USE OF ALIASES DURING THE DEBUGGING OF APPLICATIONS

CROSS-REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"Facilitating The Debugging of Applications By Employing User Defined Or Redefined Symbols," Baker et al., Ser. No. 10/099,286, filed Mar. 15, 2002; and "Generating A Common Symbol Table For Symbols Of Independent Applications," Baker et al., Ser. No. 10/099,508, filed Mar. 15, 2002.

TECHNICAL FIELD

This invention relates, in general, to the debugging of computer applications, and in particular, to facilitating the use of aliases during the debugging of computer applications.

BACKGROUND OF THE INVENTION

Computer applications (or programs) are created using programming languages. These programming languages include human-readable text, which is translated by a compiler to generate machine-readable instructions. In particular, the compiler translates each line of the programming language into machine-readable instructions, which perform the logical task described by the line of programming language code.

During the course of programming, errors may occur due to programmer error. These errors include either syntax errors or logic errors. Syntax errors are caught by the compiler, which refuses to generate machine instructions for a line of programming language that it does not understand. Logic errors are caught by detecting that the application does not perform as expected, often resulting in program exceptions or incorrect behavior. While syntax errors can be corrected by determining the correct syntax, logic errors are often much more difficult to ascertain. For this reason, a special class of computer programs has been developed. These programs are called debuggers. One example of a debugger is described in U.S. Pat. No. 4,636,940, entitled "Logic Analyzer Using Source Programs Or Other User Defined Symbols In The Trace Specification And The Trace Listing", issued Jan. 13, 1987, which is hereby incorporated herein by reference in its entirety. A debugger allows the user to trace through the user's own application, while it is executing on the computer, to determine the instance or instances where the logical flow of the application is incorrectly designed.

A debugger uses debugging information to debug, at runtime, the state of variables of the application. The debugging information describes how the variables of the application are stored and what fields the variables contain. Examples of techniques to generate debugging information are described in U.S. Pat. No. 5,715,460 entitled "Template Based Facility For Formatting Compiler Output," issued Feb. 3, 1998; and U.S. Pat. No. 5,560,009, entitled "Generating Symbolic Debug Information by Merging Translation and Compiler Debug Information," issued Sep. 24, 1996, each of which is hereby incorporated herein by reference in its entirety.

In one example, in order to obtain debugging information for a particular variable, the user enters the variable name into the debugger. However, often the variable name is complex and/or long, since it is typically generated by the compiler. Thus, it is useful to allow the user to create a simplified name (i.e., an alias) to reference the variable. This is especially true when the use of aliases is supported by the compiler and/or when the same application is to be debugged multiple times.

Although previous attempts have been made to allow, in certain limited circumstances, the use of aliases during debugging, a need still exists for an enhanced capability to facilitate the use of aliases during debugging. In particular, a need exists for a capability that facilitates the use of aliases during debugging, even when the aliases are not known to the debug generation stage of the compiler.

SUMMARY OF THE INVENTION

The shortcomings of the prior art are overcome and additional advantages are provided through the provision of a method of facilitating the use of aliases in debugging of applications. The method includes, for instance, obtaining an alias of an application to be debugged, the alias being unknown to at least a debug generation stage of a compiler of the application; and resolving the alias to a name known to the compiler to facilitate use of the alias in debugging of the application.

In another aspect of the present invention, a method of facilitating debugging of applications is provided. The method includes, for instance, obtaining an alias of an application to be debugged, the alias lacking associated debug information; and debugging at least a portion of the application using the alias.

In yet another aspect of the present invention, a method of managing the use of aliases in debugging of applications is provided. The method includes, for instance, determining whether a user attempting to use an alias in debugging at least a portion of the application is authorized to use the alias; and providing debug information for the alias, in response to the determining indicating authorization.

System and computer program products corresponding to the above-summarized methods are also described and claimed herein.

Advantageously, a capability is provided that facilitates the use of aliases during the debugging of applications. In one aspect, the capability enables aliases, which are not known to the debug generation stage of the compiler, to be used during the debugging. This allows users to use simplified names to reference complex symbols without foregoing the debugging of those names.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 depicts one example of an alias table used during debugging of an application, in accordance with an aspect of the present invention.

BEST MODE FOR CARRYING OUT THE INVENTION

In one aspect of the present invention, a capability is provided for facilitating the use of aliases during the debugging of computer applications. As one example, the aliases used during the debugging are unknown to the compiler (or assembler) of the application. For example, they are not known to the debug generation stage of the compiler, and thus, debug information is not generated by the compiler for those aliases.

Figure 1A:
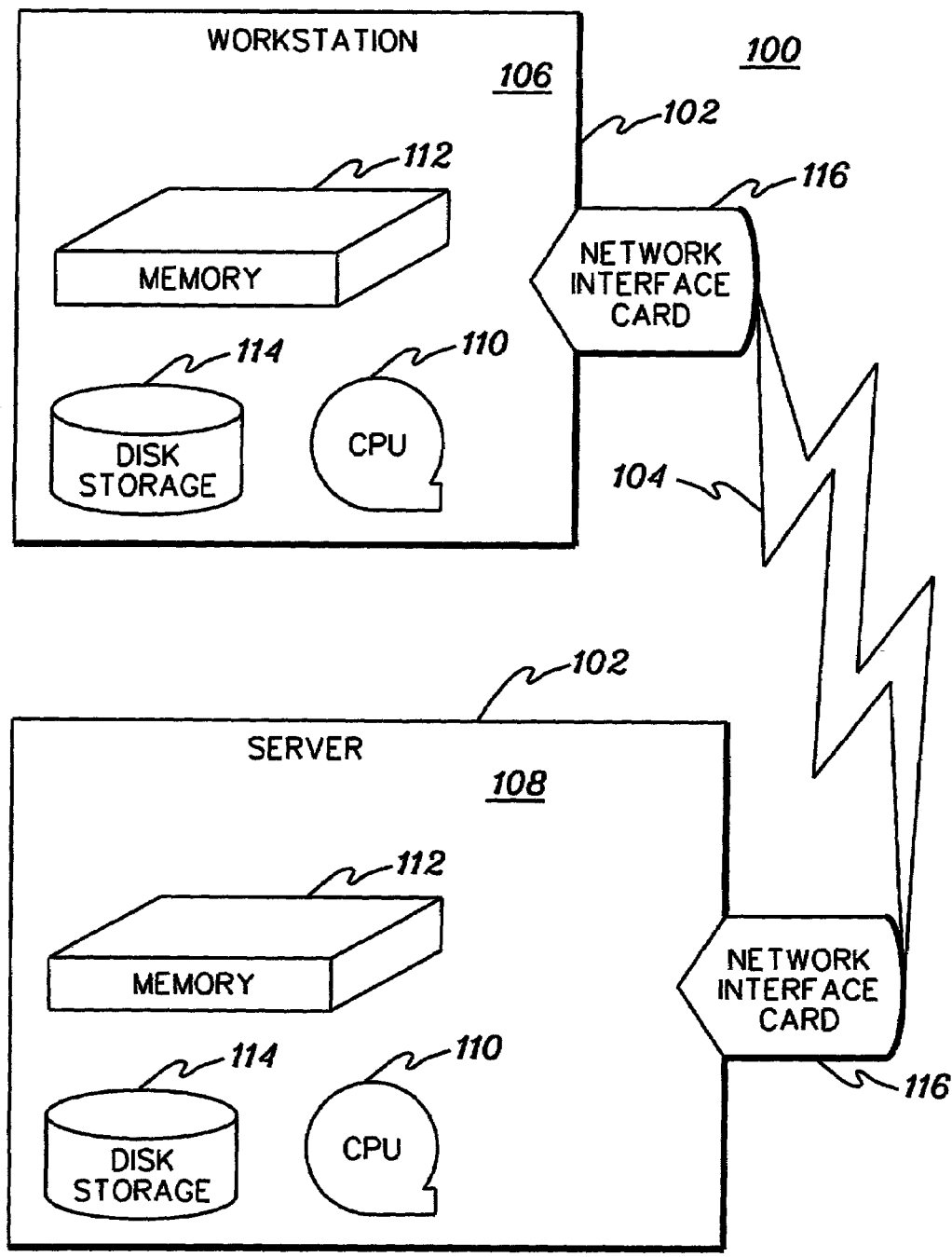
FIG. 1a depicts one embodiment of a computing environment incorporating and using one or more aspects of the present invention.

One embodiment of a computing environment incorporating and using one or more aspects of the present invention is depicted in FIG. 1a. A computing environment 100 includes, for instance, a plurality of computing units 102 coupled to one another via a connection 104. In one example, one of the computing units is a workstation 106 executing an operating system, such as Windows NT or LINUX, as examples, and the other computing unit is a server 108 executing the z/OS or OS/390 operating system offered by International Business Machines Corporation, Armonk, N.Y. Each computing unit includes, for example, a central processing unit (CPU) 110, memory 112, and one or more input/output devices 114, which are well known in the art.

Connection 104 is, for instance, a TCP/IP connection, which includes a network interface card 116 at each end. In other embodiments, however, connection 104 may be any type of connection, such as a wire connection, token ring or network connection, to name just a few examples.

The computing environment described above is only one example. One or more aspects of the present invention can be incorporated and used with other types of computing units, computers, processors, nodes, systems, workstations and/or other environments, without departing from the spirit of the present invention.

For example, aspects of the present invention can be used in a single system environment. One such environment may include, for instance, an RS/6000 computer system running the AIX operating system offered by International Business Machines Corporation, Armonk, N.Y. In yet a further embodiment, one or more aspects of the invention can be included in a large parallel system with a plurality of units coupled to one another. These and many other types of environments are capable of incorporating and using aspects of the present invention.

Figure 1B:
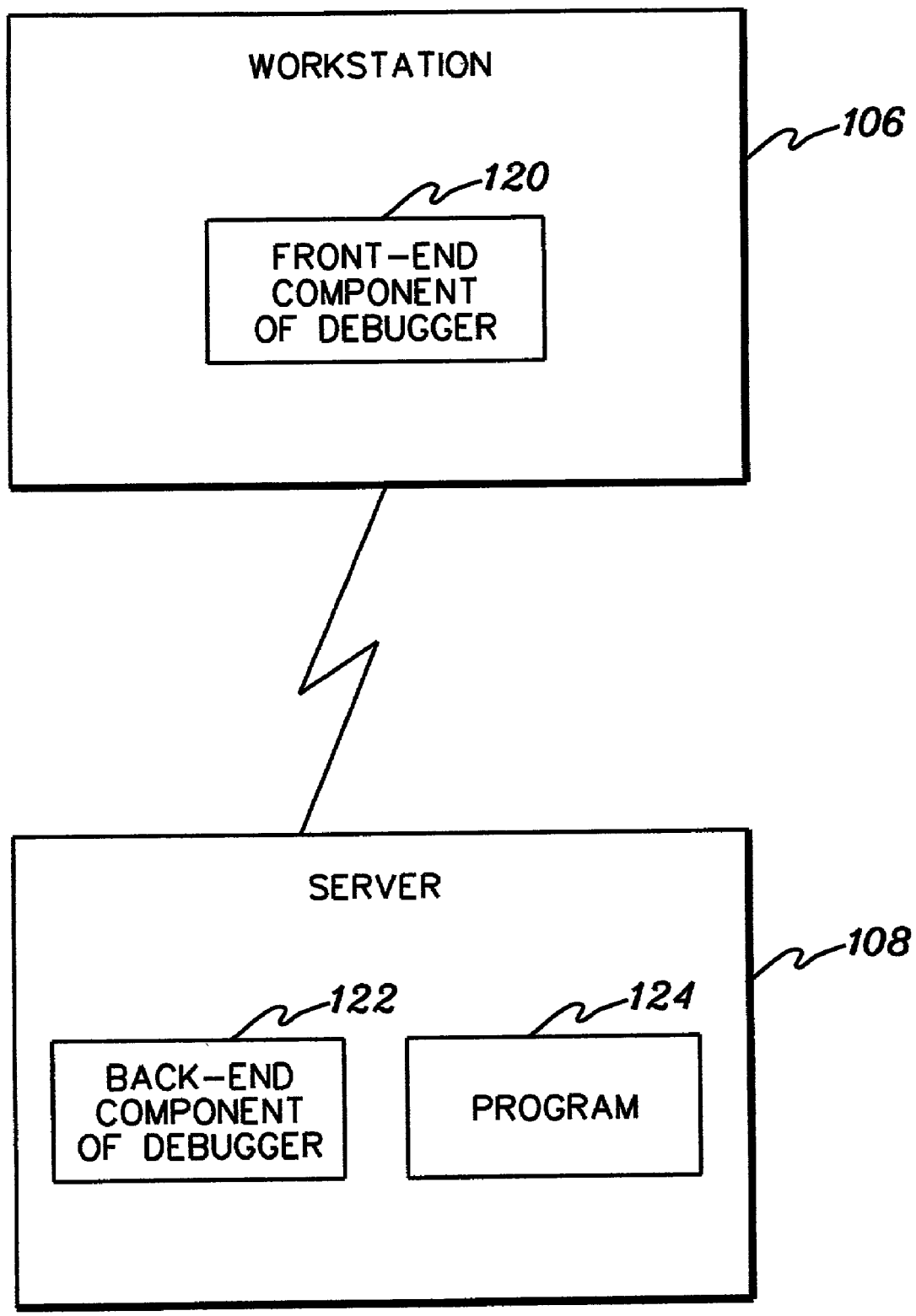
FIG. 1b depicts one embodiment of a distributed debugger executing within the computing environment of FIG. 1a, in accordance with an aspect of the present invention.

In one embodiment, executing within the computing environment is a debugger. As one example, this debugger is a distributed debugger, in which components of the debugger are run on the various computing units. For example, as shown in FIG. 1b, a front-end component 120 of a debugger is executing on workstation 106 and a back-end component 122 of the debugger is executing on server 108. The front-end component includes a user interface to facilitate user input to the debugger; and the back-end component includes the logic used in performing the debugging of a user's program 124 running on server 108. One example of such a distributed debugger is the IBM distributed debugger.

Although a distributed debugger is described herein, the capabilities of the present invention are not limited to such a debugger. Non-distributed debuggers may also be used. For example, one or more aspects of the present invention can be incorporated and used in a single system environment using a non-distributed debugger.

A debugger is used during application development to detect one or more errors within the application. The debugger uses, for instance, debugging information. This debugging information is provided by the compiler, when a debugging option is chosen. As one example, the debugging information includes symbols generated by the compiler that represent each variable or inline definition included in the application source.

A symbol describes, for instance, the location of a variable in memory at any given time that variable is active in the program. As one example, a symbol includes information about the name of a variable, the type of a variable, and the address or list of addresses for the variable. For example, if the variable int i is declared in a program, a symbol is generated for the variable. The symbol includes, for instance, information about the name (i), the type (int), and information the compiler generates about how to locate the variable.

In one example, the debugger displays debug information associated with one or more variables of the application. The one or more variables are selected by, for instance, a user debugging the application. Although the selected variables are often defined in the source code version of the application, there is typically a restriction on the variables that can be displayed to the user. For instance, the variables that can be displayed are limited to the strict or formal names for the variables, which have been generated by the compiler, even in those cases where the compiler allows the use of aliases in the application code.

For example, assume the following aliases are used in the application code:

```
#define A x
#define B y
#define ANOTHER_ALIAS x+y
x=1;
y=2;
B=3;
A=4.
```

In the above example, the programmer uses various aliases, including aliases A, B and ANOTHER_ALIAS. However, the preprocessor of the compiler replaces any occurrences of A, B, and ANOTHER_ALIAS with the variables x, y, and x+y, respectively. Thus, when debugging information is generated by the compiler, the compiler only generates symbols for x, y, and x+y, since the preprocessor has eliminated the values of A, B and ANOTHER_ALIAS. Therefore, when the debugger is used to debug this section of code, the user is not shown debugging information for A, B or ANOTHER_ALIAS, since these aliases are not known to the debug generation stage of the compiler.

To alleviate the above problem, a capability is provided, in accordance with an aspect of the present invention, that facilitates the use of aliases during debugging of applications, even when the compiler does not generate debug information for the aliases (i.e., the aliases are not known to the compiler) or even when the aliases are not within the application code.

In one embodiment, this capability includes adding an alias translation step to the symbolic expression evaluation process of the debugger, in which an alias is resolved to its formal name, such that the formal name can be looked-up in one or more symbol tables to provide debug information for the formal name, and thus, the alias.

The alias is resolved, in one embodiment, using an alias look-up table 200 (FIG. 2). In one example, alias look-up table 200 includes one or more entries 202, and each entry includes, for instance, an alias name 204 indicating the simplified name chosen by the end user or system administrator; a formal name 206 indicating the name corresponding to the alias that is known to the compiler (e.g., the name that exists in the symbol table created by the compiler); and a user field 208 that identifies one or more users eligible to use the alias name of that entry. User field 208 can include a user name, a user id, an IP address that identifies a remote debug session, as well as other identifying information, as examples. Different users can define their own alias entries (with the same or different alias names) and those entries do not affect other users' definitions. Further, an administrator can define an entry for one or more users.

In one example, the alias look-up table is initially created from a set of aliases generated from output of the compiler preprocessor. The alias table is also dynamically maintainable allowing additional entries to be added by the user or system administrator. For instance, entries created by the user at, for instance, runtime may be added. In other embodiments, the alias look-up table can be created and/or maintained in other ways. For instance, it is not necessary to initially create the table from preprocessor output.

Figure 3:
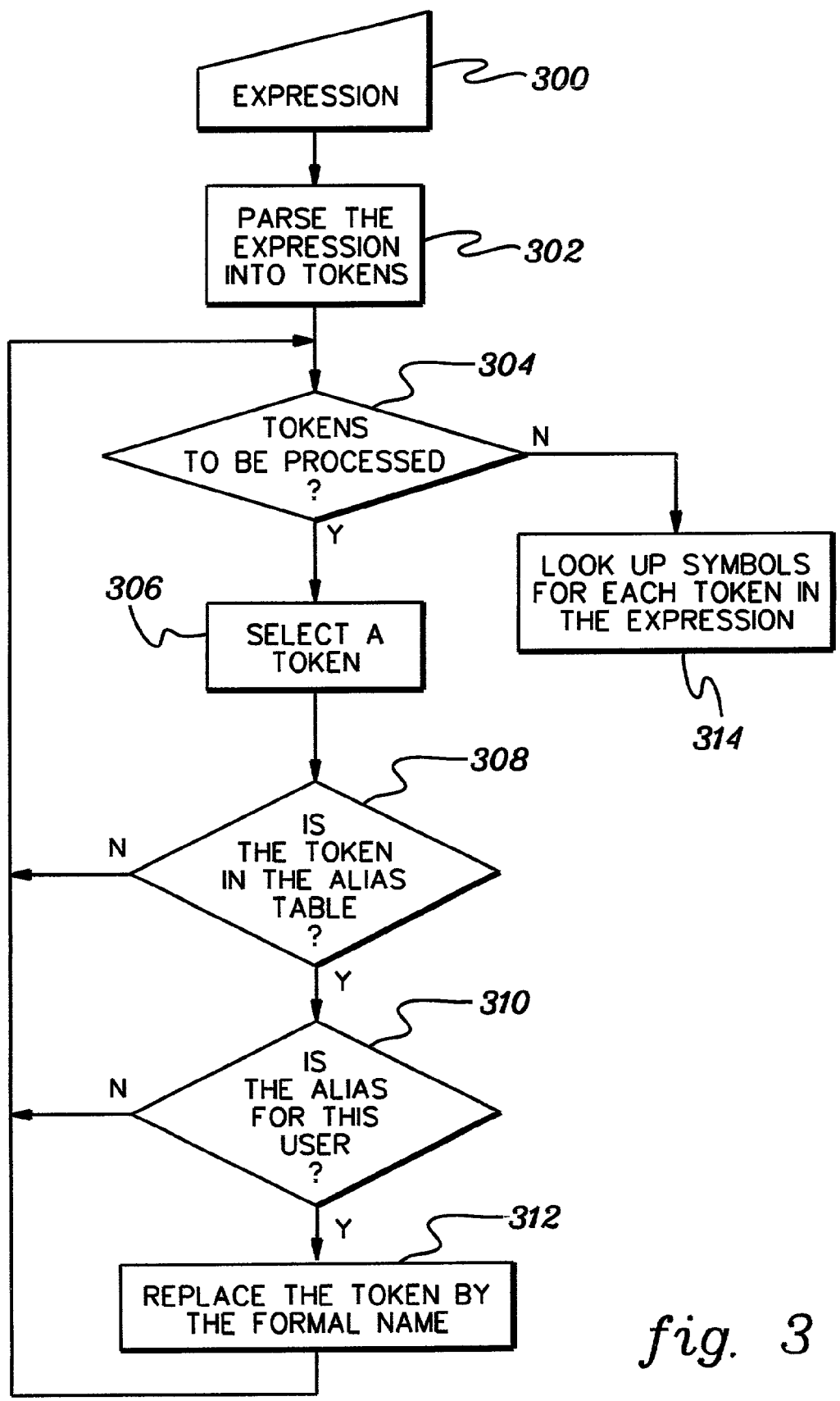
FIG. 3 depicts one embodiment of the logic associated with using the alias table of FIG. 2 to resolve aliases during the debugging of an application, in accordance with an aspect of the present invention.

One embodiment of the logic associated with using the alias look-up table to resolve aliases, and therefore, provide debugging information for the aliases, in accordance with an aspect of the present invention, is described with reference to FIG. 3. The logic of FIG. 3 is performed by the debugger, as one example.

Initially, an expression to be debugged is obtained (e.g., provided, received, have), STEP 300. For example, a user enters the expression into the debugger. Thereafter, the expression is parsed into its various tokens, such as its various operands and operators, STEP 302. The parsing is performed, for instance, by a parser segment of the debugger that parses the expression based on rules associated with the particular programing language used to code the expression.

Subsequent to parsing the expression or at least a portion of the expression, a determination is made as to whether there are tokens to be processed, INQUIRY 304. Should there be tokens to be processed, then a token is selected, STEP 306.

Thereafter, a determination is made as to whether the selected token is in the alias table, INQUIRY 308. If the selected token is not in the alias table, then processing continues with INQUIRY 304 to determine if there are more tokens to be processed. Otherwise, should the token be in the alias table indicating that it is an alias of a variable, then, in one embodiment, a further determination is made as to whether the user debugging the expression is eligible to use the alias, INQUIRY 310. If the user is ineligible to use the alias, then processing once again continues with INQUIRY 304. However, if the user is eligible to use this alias, then the alias is resolved by replacing the token with its formal name, which is obtained from the alias table, STEP 312. Thereafter, processing continues with INQUIRY 304.

At INQUIRY 304, when there are no more tokens to be processed, then each token is looked up in one or more symbol tables (e.g., created by the compiler, assembler and/or translator) to obtain debugging information, if any, associated with that token, STEP 314. Thus, debugging information is obtained for the tokens of the expression, including any tokens that are aliases.

In one further embodiment, a formal name for an alias might itself need to be parsed into separate tokens. Should this be necessary or desired, then the process described above would be repeated for that alias expression. As one example, the recursive parsing is performed prior to the symbol look-up of STEP 314.

Further, although in the above embodiment user checking is performed for the alias (i.e., INQUIRY 310), in another embodiment, this step may be eliminated.

Described in detail above is a capability for facilitating the use of aliases during the debugging of applications. In one embodiment, the debugger is enhanced to support the use of aliases by adding supporting resolution techniques to the parser. The added capability is used to determine when an alias has been entered by a user of the debugger and to resolve the alias to the reference variable, which replaces the alias in the expression context. The capabilities of the present invention are not limited to aliases which are created by the compiler, but instead, include aliases added by users at runtime, aliases that are unknown to the compiler, and/or aliases that are a part of other programs, etc.

Although the embodiments herein refer to a compiler, aspects of the invention are equally applicable to an assembler environment or other like environments. For instance, an alias can be coded in assembler using EQU statements, which provide aliases for absolute symbols. Thus, the term compiler includes degenerate forms of compilers, such as assemblers and other like components.

Moreover, although the term table is utilized herein, the structure used to hold the alias information is not limited to a table structure. Many types of data structures are usable, and thus, the term table includes those structures.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating the use of aliases in debugging of applications, said method comprising:

obtaining an alias of an application to be debugged, the alias being unknown to at least a debug generation stage of a compiler of the application; and resolving the alias to a name known to the compiler to facilitate use of the alias in debugging of the application.

2. The method of claim 1, wherein said resolving comprises using an alias table to determine the name known to the compiler.

3. The method of claim 2, wherein said alias table comprises one or more entries, and wherein an entry of the one or more entries includes the alias and the name known to the compiler corresponding to the alias.

4. The method of claim 3, wherein the entry further includes an indication of one or more users associated with said alias.

5. The method of claim 2, wherein said alias table is dynamically maintainable.

6. The method of claim 2, wherein the alias is added to the alias table at runtime.

7. The method of claim 2, wherein said alias table comprises one entry having the alias and an indication of one or more users associated with the alias, and another entry having the alias and an indication of one or more other users associated with the alias.

8. The method of claim 1, wherein said resolving comprises determining whether a user debugging the application is associated with the alias, and resolving the alias in response to the determining indicating an association.

9. The method of claim 1, wherein said obtaining comprises receiving an expression from a user debugging the application, said expression including said alias.

10. A method of facilitating debugging of applications, said method comprising:

obtaining an alias of an application to be debugged, the alias lacking associated debug information; and debugging at least a portion of the application using the alias.

11. The method of claim 10, wherein the debugging comprises:

resolving the alias to a formal name of the alias; and obtaining debug information for the formal name.

12. The method of claim 11, wherein said resolving comprises using an alias table to determine the formal name.

13. A method of managing the use of aliases in debugging of applications, said method comprising:

determining whether a user attempting to use an alias in debugging at least a portion of an application is associated with the alias; and providing debug information for the alias, in response to the determining indicating an association.

14. The method of claim 13, wherein said determining comprises checking an alias table to determine whether the user is associated with the alias.

15. The method of claim 13, wherein said providing comprises resolving the alias to a name known to a compiler of the application in order to associate the debug information of that name with the alias.

16. The method of claim 15, wherein said resolving comprises using an alias table to determine the name known to the compiler.

17. A system of facilitating the use of aliases in debugging of applications, said system comprising:

an alias of an application to be debugged, the alias being unknown to at least a debug generation stage of a compiler of the application; and means for resolving the alias to a name known to the compiler to facilitate use of the alias in debugging of the application.

18. The system of claim 17, wherein said means for resolving comprises means for using an alias table to determine the name known to the compiler.

19. The system of claim 18, wherein said alias table comprises one or more entries, and wherein an entry of the one or more entries includes the alias and the name known to the compiler corresponding to the alias.

20. The system of claim 19, wherein the entry further includes an indication of one or more users associated with said alias.

21. The system of claim 18, wherein said alias table is dynamically maintainable.

22. The system of claim 18, wherein the alias is added to the alias table at runtime.

23. The system of claim 18, wherein said alias table comprises one entry having the alias and an indication of one or more users associated with the alias, and another entry having the alias and an indication of one or more other users associated with the alias.

24. The system of claim 17, wherein said means for resolving comprises means for determining whether a user debugging the application is associated with the alias, and resolving the alias in response to the determining indicating an association.

25. The system of claim 17, further comprising means for receiving an expression from a user debugging the application, said expression including said alias.

26. A system of facilitating debugging of applications, said system comprising:

an alias of an application to be debugged, the alias lacking associated debug information; and means for debugging at least a portion of the application using the alias.

27. The system of claim 26, wherein the means for debugging comprises:

means for resolving the alias to a formal name of the alias; and means for obtaining debug information for the formal name.

28. The system of claim 27, wherein said means for resolving comprises means for using an alias table to determine the formal name.

29. A system of managing the use of aliases in debugging of applications, said system comprising:

means for determining whether a user attempting to use an alias in debugging at least a portion of an application is associated with the alias; and means for providing debug information for the alias, in response to the determining indicating an association.

30. The system of claim 29, wherein said means for determining comprises means for checking an alias table to determine whether the user is associated with the alias.

31. The system of claim 29, wherein said means for providing comprises means for resolving the alias to a name known to a compiler of the application in order to associate the debug information of that name with the alias.

32. The system of claim 31, wherein said means for resolving comprises means for using an alias table to determine the name known to the compiler.

33. A system of facilitating the use of aliases in debugging of applications, said system comprising:

an alias of an application to be debugged, the alias being unknown to at least a debug generation stage of a compiler of the application; and a debugger to resolve the alias to a name known to the compiler to facilitate use of the alias in debugging of the application.

34. A system of facilitating debugging of applications, said system comprising:
   an alias of an application to be debugged, the alias lacking associated debug information; and
   a debugger to debug at least a portion of the application using the alias.

35. A system of managing the use of aliases in debugging of applications, said system comprising:
   a debugger to determine whether a user attempting to use an alias in debugging at least a portion of an application is associated with the alias; and
   the debugger to provide debug information for the alias, in response to the determining indicating an association.

36. At least one program storage device readable by a machine tangibly embodying at least one program of instructions executable by the machine to perform a method of facilitating the use of aliases in debugging of applications, said method comprising:
   obtaining an alias of an application to be debugged, the alias being unknown to at least a debug generation stage of a compiler of the application; and
   resolving the alias to a name known to the compiler to facilitate use of the alias in debugging of the application.

37. The at least one program storage device of claim 36, wherein said resolving comprises using an alias table to determine the name known to the compiler.

38. The at least one program storage device of claim 37, wherein said alias table comprises one or more entries, and wherein an entry of the one or more entries includes the alias and the name known to the compiler corresponding to the alias.

39. The at least one program storage device of claim 38, wherein the entry further includes an indication of one or more users associated with said alias.

40. The at least one program storage device of claim 37, wherein said alias table is dynamically maintainable.

41. The at least one program storage device of claim 37, wherein the alias is added to the alias table at runtime.

42. The at least one program storage device of claim 37, wherein said alias table comprises one entry having the alias and an indication of one or more users associated with the alias, and another entry having the alias and an indication of one or more other users associated with the alias.

43. The at least one program storage device of claim 36, wherein said resolving comprises determining whether a user debugging the application is associated with the alias, and resolving the alias in response to the determining indicating an association.

44. The at least one program storage device of claim 36, wherein said obtaining comprises receiving an expression from a user debugging the application, said expression including said alias.

45. At least one program storage device readable by a machine tangibly embodying at least one program of instructions executable by the machine to perform a method of facilitating debugging of applications, said method comprising:
   obtaining an alias of an application to be debugged, the alias lacking associated debug information; and
   debugging at least a portion of the application using the alias.

46. The at least one program storage device of claim 45, wherein the debugging comprises:
   resolving the alias to a formal name of the alias; and
   obtaining debug information for the formal name.

47. The at least one program storage device of claim 46, wherein said resolving comprises using an alias table to determine the formal name.

48. At least one program storage device readable by a machine tangibly embodying at least one program of instructions executable by the machine to perform a method of managing the use of aliases in debugging of applications, said method comprising:
   determining whether a user attempting to use an alias in debugging at least a portion of an application is associated with the alias; and
   providing debug information for the alias, in response to the determining indicating an association.

49. The at least one program storage device of claim 48, wherein said determining comprises checking an alias table to determine whether the user is associated with the alias.

50. The at least one program storage device of claim 48, wherein said providing comprises resolving the alias to a name known to a compiler of the application in order to associate the debug information of that name with the alias.

51. The at least one program storage device of claim 50, wherein said resolving comprises using an alias table to determine the name known to the compiler.

* * * * *